(No Model.)

J. H. WHITAKER.
HORSE TRAINING HARNESS.

No. 444,032. Patented Jan. 6, 1891.

Witnesses:
Louis G. Sussmihl
W. W. Humphrey

Inventor:
John H. Whitaker
per Wm K. White
Attorney

UNITED STATES PATENT OFFICE.

JOHN H. WHITAKER, OF DAVENPORT, IOWA.

HORSE-TRAINING HARNESS.

SPECIFICATION forming part of Letters Patent No. 444,032, dated January 6, 1891.

Application filed December 19, 1889. Serial No. 334,345. (No model.)

*To all whom it may concern:*

Be it known that I, JOHN H. WHITAKER, a citizen of the United States, residing at Davenport, in the county of Scott and State of Iowa, have invented a new and useful Horse-Training Harness, of which the following is a specification.

My invention relates to improvements in a device for controlling the action of the limbs of a horse; and the objects of my improvements are, first, to provide straps or bands having some degree of elasticity, which are secured to and extend from the front limb to the hind limb; second, to keep such straps or bands in position on the limbs by means of body-straps, and, third, to provide the body-straps with some degree of elasticity. I attain these objects by the mechanism illustrated in the accompanying drawings, in which—

Figure 1:
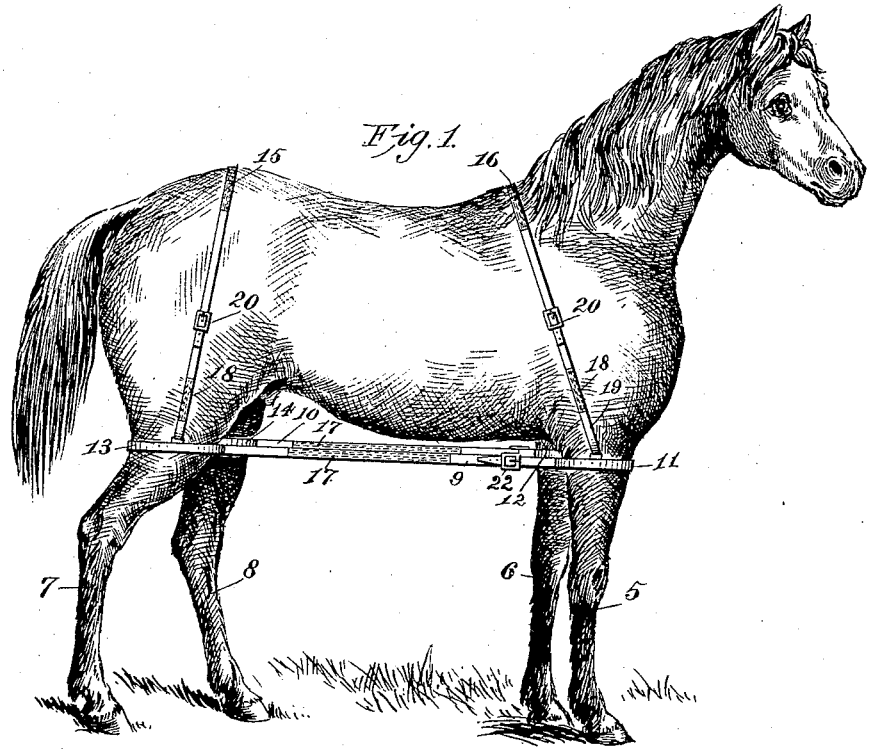
Figure 2:
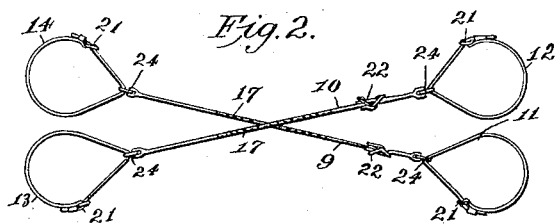
Figure 3:
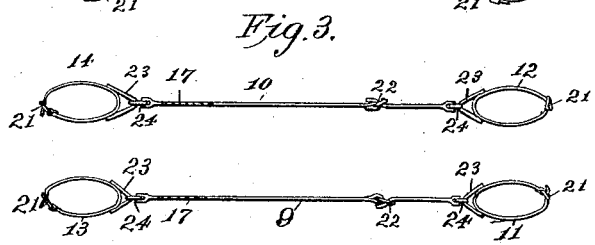

Figure 1 is a side view of a horse provided with my device when arranged for training the animal to pace. Fig. 2 is a top view of my device, the body-straps being omitted, and showing the position of the straps or bands beneath the belly of the horse when arranged for training such animal to trot; and Fig. 3 is a top view of my device, the body-straps being omitted, and showing the position of the limb-straps and their connecting-straps when arranged on the limbs of the animal to train it to pace.

Similar figures refer to similar parts throughout the several views.

5 represents the front right limb of the animal; 6, the front left limb; 7, the hind right limb, and 8 the hind left limb.

9 and 10 are straps or bands.

11, 12, 13, and 14 are the limb-straps, and 15 and 16 are the body-straps.

The straps or bands 9 and 10 are each provided with an elastic webbing or other elastic material 17, which may form the central portion of such strap, or at either end thereof, as desired. The body-straps 15 and 16 are each provided with elastic webbing or other elastic material 18 near their ends, or may be so provided centrally, if desired. A limb-strap is placed around each limb of the animal near the body, and a body-strap is attached at each end to each of the hind-limb straps and another to each of the front-limb straps, each of such body-straps passing over the body of the animal, as shown in Fig. 1. The strap 9 is attached at each end to one of the front and one of the hind limb straps, and strap 10 is also similarly attached to the other front and hind limb straps.

If it is designed to train the animal to pace, the strap 9 is attached at one end to the front-limb strap 11 and the other end to the hind-limb strap 13, and strap 10 is attached at one end to the front-limb strap 12 and the other end to the hind-limb strap 14, as illustrated in Figs. 1 and 2. If, however, it is designed to train the animal to trot, then the strap 9 is attached at its front end to the front-limb strap 11 and its rear end is attached to the hind-limb strap 14, and the front end of the strap 10 is attached to the front-limb strap 12 and its rear end is attached to the hind-limb strap 13 in such manner as to cause the straps 9 and 10 to cross each other beneath the belly of the animal, as illustrated in Fig. 2.

I prefer to construct each body-strap in three pieces, a central piece and two end pieces, each end piece being attached at one end to a limb-strap, its other end being provided with a buckle, into which buckle one end of the central piece is secured. This method of construction is illustrated in Fig. 1, wherein the end pieces on one side are represented by 19, the central pieces by 15 and 16, and the buckles by 20. In the drawings but one half or one side of each body-strap is shown; but the other half or opposite side is the same as illustrated in Fig. 1, each central piece secured to an end piece by a buckle, and each end piece provided with elastic webbing 18. I also prefer to construct the limb-straps by providing one end with a buckle 21 to receive and secure the opposite end of the strap, and such limb-straps may be of any desired width and padded on their inner surface. I also prefer to construct the straps 9 and 10 each in two pieces, one provided with a buckle 22 to receive and secure the end of the other part. An end of each strap 9 and 10, whether such strap is a single piece or of several pieces, is attached to one of the limb-straps; but I prefer to attach them as illustrated in Fig. 2. Each limb-strap carries a ring 24, and an end of each strap 9 and 10 is secured or attached to one of such rings.

I have illustrated the straps 9 and 10 in a position edgewise beneath the belly of the horse; but the same may be arranged to occupy a position sidewise or flat beneath the belly of the animal, if desired.

Other methods of attaching the several straps, as also other forms of construction of the several straps, will be readily suggested to persons skilled in the art, which are equivalents and not a departure from the scope of my invention.

I prefer to construct the straps described from leather, except at the points where the elastic webbing or other elastic material is incorporated.

I am aware that two unyielding straps have been passed diagonally beneath the belly of the animal, each strap secured at its ends to a front and hind limb, and supported in position by short straps attached to the collar and breeching of the harness; also, that upon the surcingle beneath the belly of the animal a block carrying a front and rear pulley has been attached and loops placed around the limbs of the animal, the front loops attached to the ends of an unyielding strap passed around the front pulley and the rear loops attached to the ends of another unyielding strap passed around the rear pulley, and such front and rear straps attached together by diagonal unyielding straps beneath the belly of the animal passed between the pulleys, such loops and straps being sustained in position by straps passing over the rump and withers of the animal, the ends being attached to the loops; also, that two parallel unyielding side straps have been used, the ends of each respectively attached to loops on the front and hind limbs of the animal, the side straps held in position by being attached to the ends of girth and flank straps, and also that in a rope harness it has been proposed to incorporate at points where necessary an elastic yielding fabric to produce the required elasticity.

The straps 9 and 10 permit the front and hind limbs of the animal to which they are respectively attached to move together, and the elasticity of such straps avoid throwing or straining the animal on occasion of its making false steps or movements, as would be the case were the straps rigid and unyielding, and the elasticity of the body-straps accommodate the entire device to the movements of the animal by retaining the limb-straps in position. I do not claim any of these features, broadly; but What I do claim, and desire to secure by Letters Patent, is—

In a horse-training harness, the combination of straps 9 and 10, each having elastic material incorporated therein, the limb-straps attached thereto, and the body-straps, having elastic material incorporated therein, attached to such limb-straps, substantially as described.

JOHN H. WHITAKER.

Witnesses:
 LOUIS G. SUSEMIHL,
 A. W. ELMER.